(12) United States Patent
Sjödahl et al.

(10) Patent No.: US 11,283,164 B2
(45) Date of Patent: Mar. 22, 2022

(54) RADOME CASING AND METHOD FOR MANUFACTURING THE RADOME CASING

(71) Applicant: EXEL COMPOSITES OYJ, Mäntyharju (FI)

(72) Inventors: Kim Sjödahl, Söderkulla (FI); Mikko Lassila, Tampere (FI)

(73) Assignee: EXEL COMPOSITES OYJ, Maentyharju (FI)

( * ) Notice: Subject to any disclaimer, the term of this patent is extended or adjusted under 35 U.S.C. 154(b) by 375 days.

(21) Appl. No.: 16/493,568

(22) PCT Filed: Mar. 20, 2018

(86) PCT No.: PCT/FI2018/050208
§ 371 (c)(1),
(2) Date: Sep. 12, 2019

(87) PCT Pub. No.: WO2018/172613
PCT Pub. Date: Sep. 27, 2018

(65) Prior Publication Data
US 2021/0143538 A1 May 13, 2021

(30) Foreign Application Priority Data
Mar. 21, 2017 (FI) .................. 20175253

(51) Int. Cl.
*H01Q 1/42* (2006.01)
*H01Q 1/06* (2006.01)
*B29D 22/00* (2006.01)

(52) U.S. Cl.
CPC ............ *H01Q 1/421* (2013.01); *H01Q 1/06* (2013.01); *H01Q 1/427* (2013.01); *B29D 22/00* (2013.01)

(58) Field of Classification Search
CPC .......... H01Q 1/42; H01Q 1/421; H01Q 1/422; H01Q 1/424; H01Q 1/427; H01Q 1/06
See application file for complete search history.

(56) References Cited

U.S. PATENT DOCUMENTS

2016/0380345 A1* 12/2016 Kolak .................. H01Q 1/422
343/872

FOREIGN PATENT DOCUMENTS

| EP | 1954469 B1 | 6/2014 |
| EP | 3085617 A1 | 10/2016 |
| WO | 2016/020910 A1 | 2/2016 |

OTHER PUBLICATIONS

Finnish Search Report for Application No. 20175253 dated Sep. 8, 2017.

(Continued)

*Primary Examiner* — Hoang V Nguyen
(74) *Attorney, Agent, or Firm* — Tarolli, Sundheim, Covell & Tummino LLP

(57) ABSTRACT

Invention relates to a radome casing and method for its manufacturing. The radome casing comprises walls (6, 11) of composite material which includes reinforcement fibers (8) and matrix resin (19) binding the fibers together. The walls include a radiation transmission window (11) through which the radiation of a radome antenna passes when the radome antenna (2) is mounted inside the radome casing (1). The amount of fibers in the radiation transmission window (11) is reduced to be less than 40-5% of the amount of fibers elsewhere in the casing walls (6). The reduction of reinforcement fibers in the radiation transmission window (11) reduces attenuation of the high frequency radiation.

10 Claims, 5 Drawing Sheets

(56) References Cited

OTHER PUBLICATIONS

International Search Report for Application No. PCT/FI2018/050208 dated May 30, 2018.

* cited by examiner

RADOME CASING AND METHOD FOR MANUFACTURING THE RADOME CASING

RELATED APPLICATIONS

The present invention is a U.S. National Stage under 35 USC 371 patent application, claiming priority to Serial No. PCT/FI2018/050208, filed on 20 Mar. 2018; which claims priority of FI 20175253, filed on 21 Mar. 2017, the entirety of both of which are incorporated herein by reference.

The invention relates to a radome casing comprising walls of composite material which includes reinforcement fibers and matrix resin binding the fibers together, the walls including a radiation transmission window through which the radiation of a radome antenna passes when the radome antenna is mounted inside the radome casing.

The invention relates also to method for manufacturing a radome casino, the method comprising the steps of making a straight tubular or C-formed profile of composite material by pultrusion process wherein reinforcement fibers are pulled through matrix resin and then via preforming guides and then through forming die to finalize the shape of profile walls, pulling the shaped profile via a heated mold and finally chopping up the pultruded continuous profile for radome casings of desired length.

This kind of radome casing and method for its manufacturing is prior known from EP 1954469B1.

The amount of high frequency (>1 GHz) wireless communication is rapidly increasing. Still higher frequencies are used to increase the information within a time unit. In the broadcasting base stations the walls of radome casings limit the high frequency broadcasting due to attenuation of the HF signal. In order to reduce this problem, the walls of radome casings have been made as thin as possible in view of required mechanical strength. Nevertheless, with adequate requirements for the mechanical strength and desired requirements of the broadcasting coverage, there remains too much attenuation of the HF signal. It is also well known to use materials having low dielectric constant to cover HF antennas, but these materials cannot be used to replace the reinforcement fibers in the composite material.

U.S. Pat. No. 7,151,504 B1 shows a radome that includes a widow portion and an attachment portion. The radome is manufactured into an ellipsoid-shaped radome adapted to cover a radar antenna for an aircraft, ship, or other radar installation. The radome has a sandwich structure with a thick middle layer which facilitates forming of the radome into a cup-shaped form. This form improves aerodynamics of the radome.

It has been discovered that the attenuation of the HF signal is caused mainly by the reinforcement fibers of the composite material. Most commonly glass fibers are used as the reinforcement fibers.

The object of the present invention is to further reduce the attenuation problem of the radome casing having at least its front part made of composite material.

This problem is resolved by a radome casing according to the enclosed claim 1. The problem is also resolved by a method for manufacturing the radome casing according to the enclosed claim 8. Dependent claims define advantageous embodiments of the invention.

The invention is based on realization that the amount of reinforcement fibers can be substantially reduced locally at the area of radiation window of the radome antenna. The range of reduction of the amount of the fibers may be from 60-95% of the amount of fibers elsewhere in the casing wall (=outside the desired radiation broadcasting window). The fibers can be replaced at the location of the radiation window by a filling material having a low dielectric constant, preferably lower than 4 or even lower than 3. At the location of the radiation window, the casing wall has a sandwich structure, whereby only the surface layers are made of composite material with reinforcement fibers. This structure has good strength and weather resistivity despite the fact that the amount of fibers at the location of the radiation window is reduced more than 60%, preferably more than 80% or even more than 90% from the amount of fibers elsewhere in the casing walls.

In the following five embodiments of the invention is explained in more detail by reference to the enclosed drawings, wherein FIG. 1 shows a cross section of a radome casing according to a first embodiment of the present invention;

Figure 1:
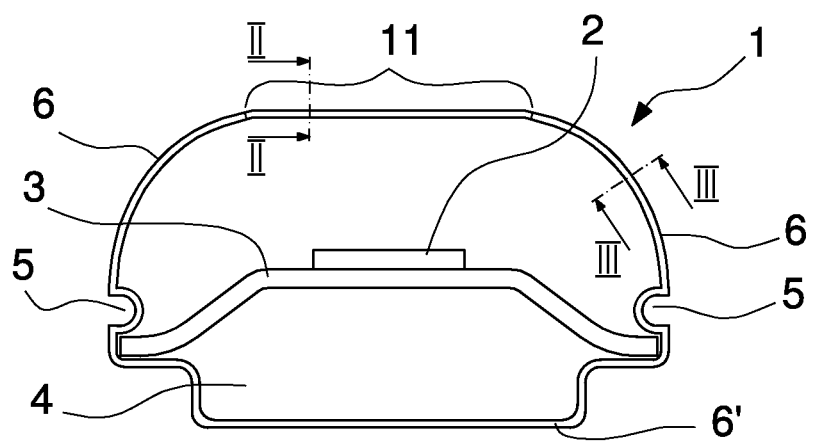
Figure 2:
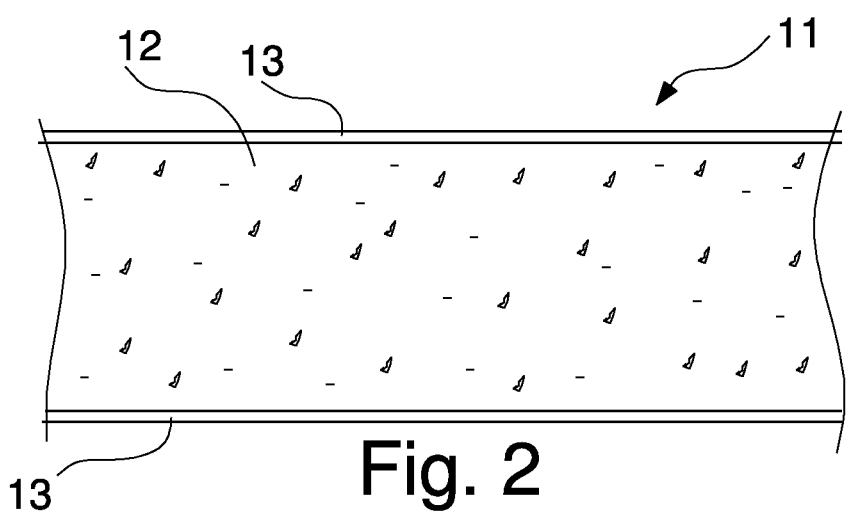
FIG. 2 shows a cross-section of the radome casing wall at the location of section line II-II in FIG. 1.
Figure 3:
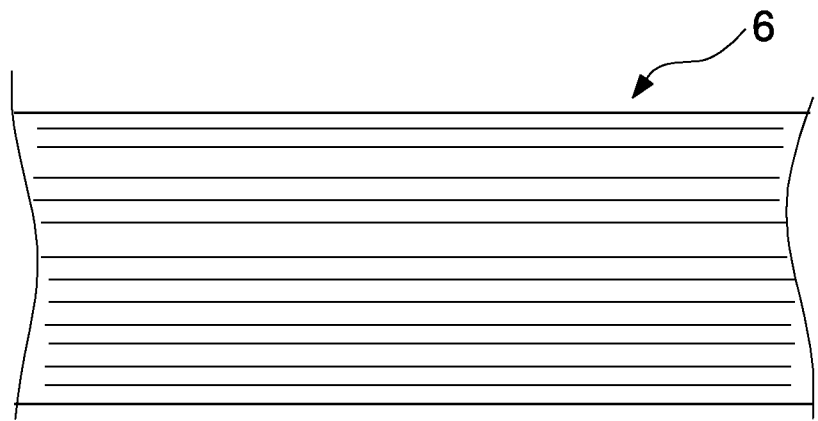
FIG. 3 shows a cross-section of the radome casing wall at the location of section line III-ITT in FIG. 1.

In FIGS. 1-3 the radome casing 1 comprises walls 6, 11 of composite material 13 which includes reinforcement fibers and matrix resin binding the fibers together. The walls 6, 11 include a radiation transmission window 11 through which the radiation of a radome antenna passes when the radome antenna 2 is mounted inside the radome casing 1. The radome antenna is mounted on a mounting plate 3 which can be inserted into the casing 1. Between the mounting plate 3 and the back wall 6' of the casino 1 there is a space 4 for cables. The walls 6' of the cable space 4 may be an integral part of the casing 1 or a separate part. In the latter case the casing 1 of the present invention is C-shaped and in the former case it has the shape of a tubular profile. In both cases the ends of the casing 1 are covered by top and bottom lids (not shown). Along the side walls 6 there are external grooves 5 for fixing the radome casing 1 in its place of use.

The invention relates to a special construction of the radiation transmission window 11 as shown in FIG. 2. The amount of fibers in the radiation transmission window 11 is less than 40%, preferably less than 30%, most preferably less than 20% of the amount of fibers elsewhere in the casing walls 6.

The radiation transmission window 11 has a sandwich structure having surface layers 13 and a middle layer 12 between the surface layers 13. The thickness of the middle layer 12 is more than 60%, preferably more than 70%, most preferably more than 80% of the thickness of the radiation transmission window 11. The reinforcement fibers are concentrated in the surface layers 13, and the middle layer 12 is made of a filling material having a dielectric constant preferably less than 4. It is also important that a dissipation factor of the filling material and the middle layer is very small, preferably lower than 0.0005.

The filling material may be plastic foam or resin or balsa wood, for instance. In a preferred embodiment the filling material includes plastic foam and thin fabric gauze for bearing the plastic foam during the manufacturing process. The plastic foam may be polymethacrylimide foam. Also polyvinylchloride foam, polyurethane foam polyethylene foam and/or polyester foam can be used as filling materials.

In order that the surface layers 13 would have uniform thickness without local variations, the reinforcement fibers of the surface layers are in the form of woven fabric. Also elsewhere in the casing wall 6 the reinforcement fibers can be partially or totally in the form of woven fabric, though also separate continuous fibers can be used.

The matrix resin of the composite material may be vinyl ester, polyester, epoxy, polyurethane or acryl resin, for instance. The reinforcement fibers of the composite material may be glass fibers, Kevlar fibers, polyester fibers, polypropylene fibers or other synthetic fibers.

Figure 4:
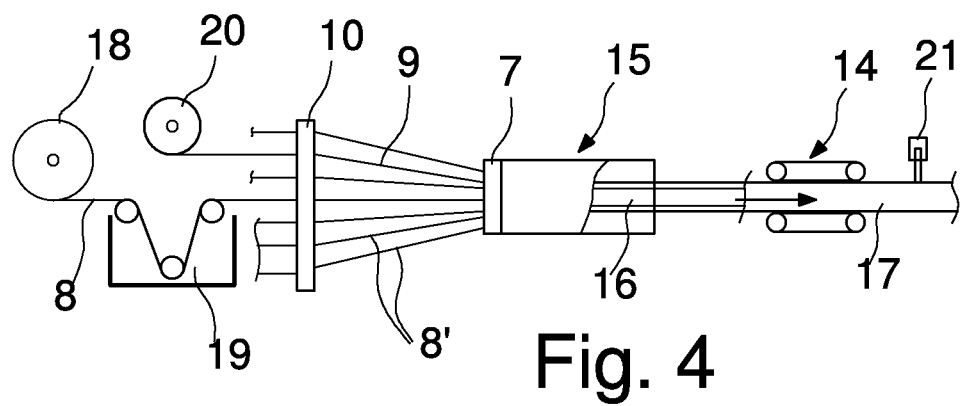
FIG. 4 shows various steps in the manufacturing method according to one embodiment of the invention.

As shown in FIG. 4, one example of a method for manufacturing a radome casing or a front part thereof comprises the steps of making a straight tubular or straight C-formed profile 17 of composite material by a pultrusion process wherein reinforcement fibers 8 are pulled from reels 18 through matrix resin 19 and the resin-wetted fibers 8' via preforming guides 10 and then through a forming die 7 to finalize the cross sectional shape of the profile walls into a heated mold 15. The mold 15 is provided with a core 16 to maintain the final cross sectional shape of the longitudinally straight profile 17. The wall thickness of the profile 17 and of the casing 1 is typically within the range of 1.5-3 mm. A continuous profile 17 obtained in the mold is drawn by means of pulling device 14. Finally the pultruded continuous straight profile 14 is chopped up by a cutting saw 21 for walls of radome casings 1 of desired length.

At a predefined cross-sectional area of the profile walls, namely at the area of the radiation transmission window 11 in FIG. 1, the amount of fibers 8, 8' is reduced more than 60% of the amount of fibers 8, 8' guided elsewhere to the profile walls. The width of said predefined cross-sectional area (=radiation transmission window 11) is more than 30%, preferably more than 50% of the width of the profile in order to have a window which is wide enough for broadcasting the radiation there through. The typical angle of broadcasting radiation beam is at the range of 30 to 90 degrees.

The reduction of fibers in said cross-sectional area is advantageously more than 70%, preferably more than 80%. The layer of filling material 9, which has dielectric constant lower than 4, preferably lower than 3, is guided from a reel 20 to said predefined cross-sectional area (=at the area of radiation transmission window 11).

At the predefined cross-sectional area the fibers 8, 8' are guided only into the surface layers of the profile walls and between the surface layers is guided a strip of filling material 9 having dielectric constant lower than 4, preferably lower than 3. The filling material may include plastic foam and fabric gauze bearing the plastic foam during guiding the plastic foam through the forming die into the mold 15.

Figure 5:
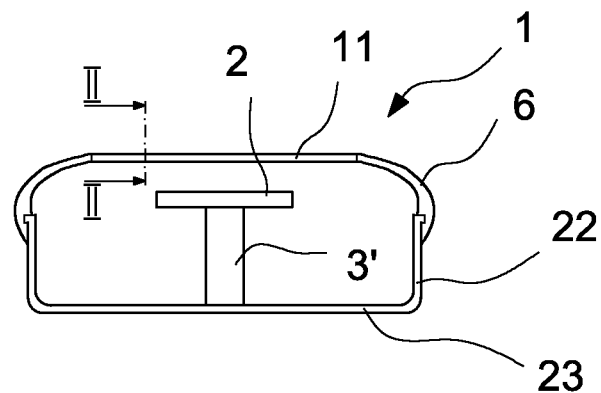
FIG. 5 shows a cross section of a radome casing according to second embodiment of the present invention.

The radome casing of FIG. 5 differs from that of FIG. 1 in that only the C-formed front part 11, 6 of the radome casing is made of the composite material, while the back wall 23 and part of side walls 22 are made of metal plate. Mounting base 3' of the radome antenna 2 is fixed to the back wall 23. The radiation transmission window 11 has the same sandwich construction as in FIGS. 1 and 2. Casing wall portions 6 outside the radiation transmission window 11 are made of composite material having full amount of reinforcement fibers. The said full amount is 30-60 volume %, typically 40-45 volume % of the composite material. This is true also with all embodiments of the invention. Casing wall portions 6 are needed only to make connection between the front part 11, 6 and the rear part 22, 23 of the casing.

The front part 11, 6 of the radome casing according to the embodiment of FIG. 5 can be manufactured as explained with reference to FIG. 4.

Figure 6:
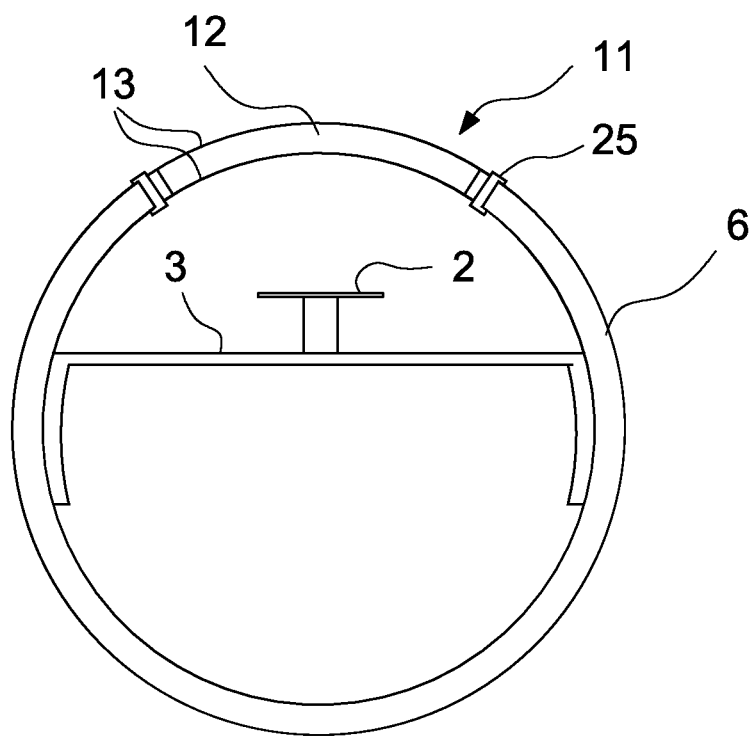
FIG. 6 shows a cross section of a radome casing along line VT-VT of FIG. 7 according to third embodiment of the present invention.
Figure 7:
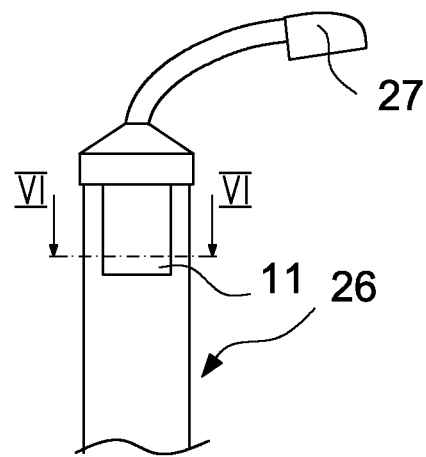
FIG. 7 shows an upper part of a street light pole which constitutes a radome casing according to the third embodiment of the invention.
Figure 8:
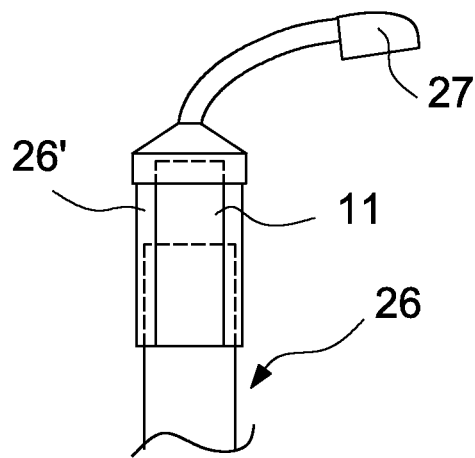
FIG. 8 shows an upper part of a street light pole which constitutes a radome casing according to fourth embodiment of the invention.

FIGS. 6-8 show embodiments where the radome casing is at a top end of a street light pole 26. It is prior known to arrange the radome casing at the top end of the street light pole, but in these prior known solutions the radome casing is a separate unit which is mounted as an extension and enlargement of the pole. This is because it has not been possible to use the walls of the pole as casing walls. The pole must resist wind and storm without too strong vibrations and swaying. Therefore, the required wall thickness and material selection of the pole does not enable sufficient penetration of high frequency radiation >1 GHz. The present invention resolves this problem by utilizing the radiation transmission window 11 such that the street light pole 26, which is made of composite material, constitutes the walls of radome casing.

In the embodiment of FIGS. 6 and 7 the radiation transmission window 11 is formed such that at the upper end of the pole 26 there has been cut an opening at the location of the window 11. This opening is then covered by a piece of wall having the previously explained sandwich structure (FIG. 2) with surface layers 13 and middle layer 12. The middle layer can be composed of different materials each having a low dielectric constant. Thickness of the middle layer is preferably ¼ of the radiation wave length to minimize reflection and maximize passing through. The piece of wall 12, 13 covering the window 11 shall be sealed by sealing material 25 against the edges of the opening in the wall of the pole 26. The piece of wall 12, 13 can be manufactured by pultrusion as previously explained.

In the embodiment of FIG. 8 the wall of window 11 is manufactured by pultrusion according to FIG. 4 to be integral with rest of the casing wall 26'. The casing wall 26' together with the window 11 form a cylindrical upper section of the street light pole 26. The pole 26 is manufactured of composite material by pultrusion. The casing wall 26' with window 11 is also manufactured of composite material by pultrusion according to FIG. 4. Then the cylindrical casing wall 26' with window 11 is joined to upper end of the pole 26 as a telescopic extension of the pole.

In both cases of FIGS. 7 and 8, any desired street light device 27 is joined to the upper end of the pole 26. By utilizing the street light poles 26 as radome masts and radome casings, the density of radomes can be made high enough for high frequency transmissions with very low costs.

Figure 9:
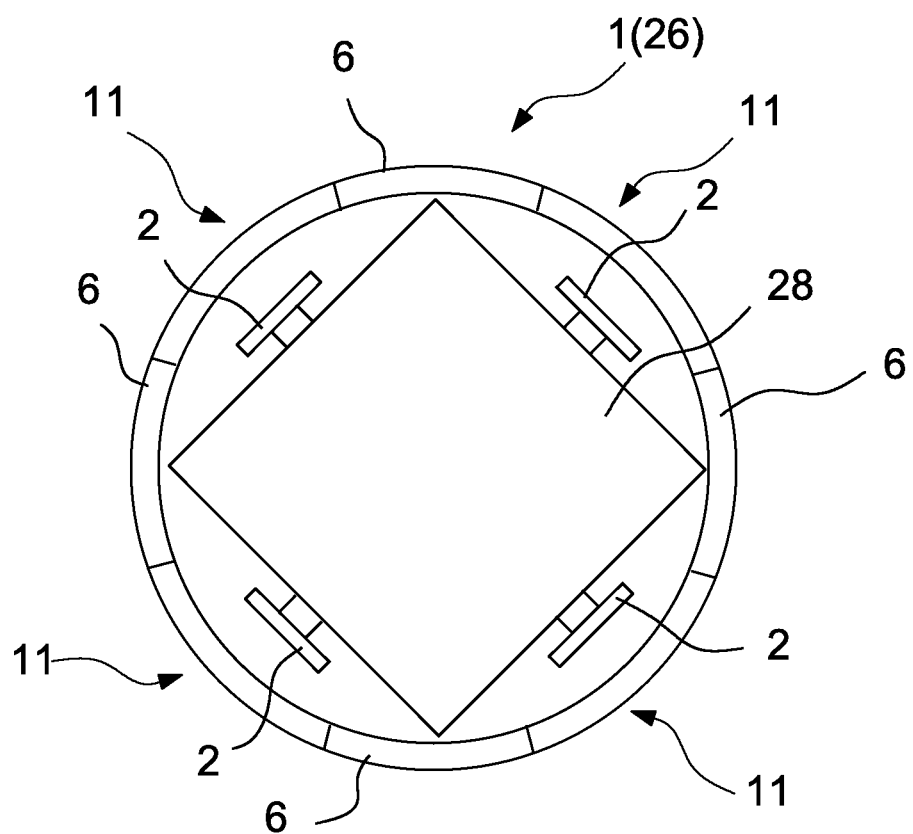
FIG. 9 shows a cross section of a tubular radome casing according to fifth embodiment of the invention.

FIG. 9 shows an embodiment where the radome antennas 2 cover 360 degrees. Within the radome casing 1 of composite material there is four antennas 2. The tubular radome casing 1 has four radiation transmission windows 11 at the locations matching the locations of antennas 2. Between these windows 11 there are wall sections 6 which have the non-reduced amount of reinforcement fibers, while at the locations of the windows 11 the amount of fibers have been reduced as explained in connection with previous embodiments. The number of antennas and windows may vary from one to any desired number. This concerns all embodiments of the invention. The radome casing 1 may be part of a street light pole 26. In the middle of the casing 1 there is a metallic support pole 28, on which the antennas 2 are placed. The support pole 28 could be either at a short length of the casing pole 1, 26, or it could extend to the whole length of the casing pole 1, 26. The support pole 28 would effectively transfer heat from the radome and could also function as constructive part of the radome and/or the street light pole.

The invention claimed is:

1. Radome casing comprising walls of composite material which includes reinforcement fibers and matrix resin binding the fibers together, the walls including a radiation transmission window through which the radiation of a radome antenna passes when the radome antenna is mounted inside the radome casing, characterized in that the walls are composed of a straight tubular or C-formed profile and the amount of fibers in the radiation transmission window is less than 40% of the amount of reinforcement fibers elsewhere in the casing walls, and that the radiation transmission window has a sandwich structure having surface layers and a middle layer between the surface layers, the reinforcement fibers being concentrated in the surface layers and the middle layer being made of a filling material.

2. Radome casing according to claim 1, characterized in that the thickness of the middle layer is more than 80% of the thickness of the radiation transmission window and a dielectric constant of the filling material is less than 4.

3. Radome casing according to claim 1, characterized in that the amount of fibers in the radiation transmission window is less than 20% of the amount of reinforcement fibers elsewhere in the casing walls.

4. Radome casing according to claim 1, characterized in that the filling material is plastic foam or resin or balsa wood and the reinforcement fibers in the surface layers are in the form of woven fabric.

5. Radome casing according to claim 4, characterized in that the filling material includes plastic foam and fabric gauze.

6. Radome casing according to claim 1, characterized in that a street light pole having at least a part of its length made of composite material, constitutes the walls of the radome casing.

7. Method for manufacturing a radome casing, the method comprising the steps of making a straight tubular or C-formed profile composite material by a pultrusion process wherein reinforcement fibers are pulled through matrix resin and then via preforming guides and then through a forming die to finalize the shape of profile walls, pulling the shaped profile via a heated mold and finally chopping up the pultruded continuous profile for radome casings of desired length, characterized in that at a predefined cross-sectional area of the profile walls, the amount of fibers is reduced more than 60% of the amount of fibers guided elsewhere to the profile walls, the width of said predefined cross-sectional area being more than 30% of the width of the profile, whereby the predefined cross-sectional area constitutes a radiation transmission window of the radome casing.

8. Method according to claim 7, characterized in that a layer of filling material having a dielectric constant lower than 4, is guided to said predefined cross-sectional area during the pultrusion process.

9. Method according to claim 8, characterized in that the filling material includes plastic foam, and fabric gauze for bearing the plastic foam during guiding the plastic foam through the forming die into the heated mold.

10. Method according to claim 7, characterized in that at the predefined cross-sectional area the fibers are guided only into the surface layers of the profile walls and between the surface layers (13) is guided a strip of filling material having a dielectric constant lower than 4.

* * * * *